United States Patent
Yoon et al.

(10) Patent No.: US 11,449,673 B2
(45) Date of Patent: Sep. 20, 2022

(54) ESG-BASED COMPANY EVALUATION DEVICE AND AN OPERATION METHOD THEREOF

(71) Applicant: ISD INC., Incheon (KR)

(72) Inventors: Duk Chan Yoon, Guri-si (KR); Dehiya Vasundhara, Seoul (KR); Ji Yeon Lim, Seoul (KR); Sergey Leksikov, Seoul (KR)

(73) Assignee: ISD INC., Incheon (KR)

( * ) Notice: Subject to any disclaimer, the term of this patent is extended or adjusted under 35 U.S.C. 154(b) by 910 days.

(21) Appl. No.: 16/320,537

(22) PCT Filed: Nov. 23, 2017

(86) PCT No.: PCT/KR2017/013445
§ 371 (c)(1),
(2) Date: Jan. 25, 2019

(87) PCT Pub. No.: WO2019/103183
PCT Pub. Date: May 31, 2019

(65) Prior Publication Data
US 2021/0365486 A1 Nov. 25, 2021

(30) Foreign Application Priority Data
Nov. 23, 2017 (KR) .................. 10-2017-0157068

(51) Int. Cl.
*G06F 16/35* (2019.01)
*G06F 40/20* (2020.01)
(Continued)

(52) U.S. Cl.
CPC .......... *G06F 40/20* (2020.01); *G06F 16/3347* (2019.01); *G06F 16/353* (2019.01);
(Continued)

(58) Field of Classification Search
CPC .... G06F 40/20; G06F 16/353; G06F 16/3347; G06F 40/237; G06F 40/30; G06N 20/20; G06N 7/005; G06K 9/6215
See application file for complete search history.

(56) References Cited

U.S. PATENT DOCUMENTS

2016/0357753 A1* 12/2016 Beaver .............. G06F 16/24578
2017/0004128 A1 1/2017 Yoon et al.
2019/0012374 A1* 1/2019 Petroni ............. G06F 16/90332

FOREIGN PATENT DOCUMENTS

KR 10-2010-0113423 A 10/2010
KR 10-0995974 B1 11/2010
(Continued)

OTHER PUBLICATIONS

International Search Report for PCT/KR2017/013445 dated Aug. 20, 2018 from Korean Intellectual Property Office.

*Primary Examiner* — Truong V Vo
(74) *Attorney, Agent, or Firm* — Revolution IP, PLLC

(57) ABSTRACT

Provided is an Environment, Social, Governance (ESG) company evaluation device for evaluating a company from the viewpoint of ESG to calculate a score. The device includes: a news collection unit configured to collect a plurality of news articles on Internet and classify them by date or company, and perform clustering on news articles whose similarity is higher than a reference value through a similarity analysis between the news articles; a news classification unit configured to classify each of the news articles related to an issue of environment, society, or governance; and an evaluation result deriving unit configured to calculate an ESG risk for a corresponding cluster in cluster units and calculate an ESG company evaluation score based on the calculated value.

9 Claims, 6 Drawing Sheets

(51) Int. Cl.
  *G06N 20/20* (2019.01)
  *G06F 16/33* (2019.01)
  *G06F 40/237* (2020.01)
  *G06F 40/30* (2020.01)
  *G06K 9/62* (2022.01)
  *G06N 7/00* (2006.01)

(52) U.S. Cl.
  CPC ............ *G06F 40/237* (2020.01); *G06F 40/30* (2020.01); *G06K 9/6215* (2013.01); *G06N 7/005* (2013.01); *G06N 20/20* (2019.01)

(56) References Cited

FOREIGN PATENT DOCUMENTS

| | | |
|---|---|---|
| KR | 10-2014-0073624 A | 6/2014 |
| KR | 10-1710649 B1 | 2/2017 |
| KR | 10-1741509 B1 | 6/2017 |

\* cited by examiner

Fig. 3

| Extracted Nouns | 1st type Classification | 2nd type Classification | Category |
|---|---|---|---|
| batteri | gen | NA | gen_NA |
| beat | D | Hum | D_Hum |
| benchmark | gen | NA | gen_NA |
| bird | S | Env | S_Env |
| blacklist | D | Company | D_Company |
| blame | D | gen | D_gen |
| blast | D | gen | D_gen |
| bleed | D | Hum | D_Hum |
| blew | D | gen | D_gen |
| blind | D | gen | D_gen |
| blood | D | Hum | D_Hum |
| blow | D | gen | D_gen |
| blown | D | gen | D_gen |
| blowout | D | gen | D_gen |
| board | S | Company | S_Company |
| bomb | D | gen | D_gen |
| bombard | D | gen | D_gen |
| bomber | D | gen | D_gen |
| bribe | D | Fin | D_Fin |
| bribeback | D | Fin | D_Fin |

Fig. 4

| Category | Frequency | Words | Priority | Normalized Values | Level |
|---|---|---|---|---|---|
| D_Company | 1 | controversi | 1 | 0.002976190 | 1 |
| D_Fin | 5 | compens,reimburs,sold | 5 | 0.014880952 | 1 |
| D_gen | 3 | alleg,conflict,damag | 4 | 0.008928571 | 1 |
| D_legal | 98 | appeal,court,infring,lawsuit,order,rule,trial,violat | 8 | 0.291666667 | 5 |
| S_company | 57 | busi,compani,depart,industri,offici,patent,review,subsidi... | 7 | 0.169642857 | 4 |
| S_Gov | 1 | agenc | 2 | 0.002976190 | 1 |
| S_Hum | 8 | local,peopl | 6 | 0.023809524 | 1 |
| gen_NA | 2 | ban,issu | 3 | 0.005952381 | 1 |

ESG-BASED COMPANY EVALUATION DEVICE AND AN OPERATION METHOD THEREOF

BACKGROUND

The present invention relates to Environment, Social, Governance (ESG)-based company evaluation device and an operation method thereof, more particularly, to a device for collecting and analyzing news articles on the Internet to analyze and scale the risks associated with environmental, social or governance issues that companies have and an operation method thereof.

Recently, companies more focus on risk management, evaluate their own companies and other companies in various aspects, and apply such evaluation results to risk management for investment, merger and production lines.

In general, it was common for companies to evaluate companies based on quantitative financial data, but recently, a methodology for evaluating companies and analyzing risks based on non-financial data has emerged. Any disadvantageous content to the company is not reflected on the financial data disclosed by the companies does not reflect, and reliability of financial reports provided by companies is also questionable. When we look at the reasons that companies need to analyze non-financial data, as people's SNS activities through the Internet become more active, in some cases, company reputation is shaken by certain rumors about a company or product and risks associated with corporate crime or health related rumors may increase the risk of the company. However, these events are difficult to analyze through financial data. As a result, companies may be analyzed through financial data as well as non-financial data, thereby enabling more accurate corporate evaluation.

In such a trend, a methodology for analyzing non-financial data by dividing it into three themes of Environment, Social, and Governance (ESG) receive attentions.

While there have been companies that write evaluation reports on companies based on non-financial data such as ESG, since non-financial data is highly subjective and the rate at which reports are written is relatively slow, there were some difficulties for companies to utilize them. In performing a company evaluation in order to improve these disadvantages through a computer program or the like that collects and automatically analyzes news articles about ESG on the Internet, there were many difficulties in automating the classification and evaluation of news articles because the news articles were not formalized data.

SUMMARY

One object of the present invention is to collect news articles on the Internet and to perform ESG-based evaluation based on the collected news articles.

Another object of the present invention is to cluster news articles dealing with the same event through a similarity analysis between collected news articles.

Another object of the present invention is to improve the performance in categorizing the collected news by allowing the device for performing ESG company evaluation to select a machine learning algorithm and perform learning.

An embodiment of the inventive concept provides a Environment, Social, Governance (ESG) company evaluation device for evaluating a company from the viewpoint of ESG to calculate a score including: a news collection unit configured to collect a plurality of news articles on Internet and classify them by date or company, and perform clustering on news articles whose similarity is higher than a reference value through a similarity analysis between the news articles; a news classification unit configured to classify each of the news articles related to an issue of environment, society, or governance; and an evaluation result deriving unit configured to calculate an ESG risk for a corresponding cluster in cluster units and calculate an ESG company evaluation score based on the calculated value.

In an embodiment, the news collection unit may perform morpheme analysis using a morpheme analyzer corresponding to a language in which the news articles are written, and perform vectorization on each of the news articles based on a morphological analysis result, wherein the similarity analysis is performed through cosine similarity analysis for each of the news articles.

In an embodiment, a method of the news collection unit to perform vectorization for each of the news articles through a morphological analysis result may use a Term Frequency-Inverse Document Frequency (TF-IDF) value.

In an embodiment, before classifying each of the news articles related to an environmental, social, or governance issue, the news classification unit may first classify in a true-false fashion whether the news articles are associated with at least one of environment, society or governance.

In an embodiment, after classifying each of the news articles related to an issue of environment, society, or governance, the news classification unit may divide each of the issues into subdivided categories and classifies each of the news articles into the category.

In an embodiment, before classifying each of the news articles related to an issue of environment, society, or governance, the news classification unit may adopt a specific machine learning algorithm and performs learning through practice data to improve classification ability.

In an embodiment, the machine learning algorithm adopted by the news classification unit can be any one of Multinomial Bayes, Bernoulli Bayes, Stochastic Gradient Descend (SGD), Linear SVC, Perceptron, or Random Forest.

In an embodiment, evaluation result deriving unit may perform categorization for nouns extracted from the news articles, and perform priority setting or proof level calculation for the category items in cluster units based on a frequency of words included in each category item.

In an embodiment, the evaluation result deriving unit may calculate a probability that each cluster belongs to an issue of environment, society, or governance based on a calculated evidence level value.

In an embodiment, wherein in calculating the ESG company evaluation score, the evaluation result deriving unit may use a calculated evidence level value and a probability that each cluster belongs to environment, society, or governance.

In an embodiment of the inventive concept, a method for evaluating a company from the viewpint of ESG and calculate a score includes: collecting a plurality of news articles on Internet and classify them by date or company, and performing clustering on news articles whose similarity is higher than a reference value through a similarity analysis between the news articles; classifying each of the news articles related to an issue of environment, society, or governance; and calculating an ESG risk for a corresponding cluster in cluster units and calculating an ESG company evaluation score based on the calculated value.

BRIEF DESCRIPTION OF THE FIGURES

The accompanying drawings are included to provide a further understanding of the inventive concept, and are incorporated in and constitute a part of this specification. The drawings illustrate exemplary embodiments of the inventive concept and, together with the description, serve to explain principles of the inventive concept. In the drawings:

FIG. 3 is a diagram for explaining a method of the evidence level calculation unit to categorize nouns extracted from news articles.

FIG. 4 is a diagram for explaining a method of the evidence level calculation unit to set and normalize the priority of an item based on the number of words included in the category item, and calculate an evidence level based on normalized values.

DETAILED DESCRIPTION

Figure 1:
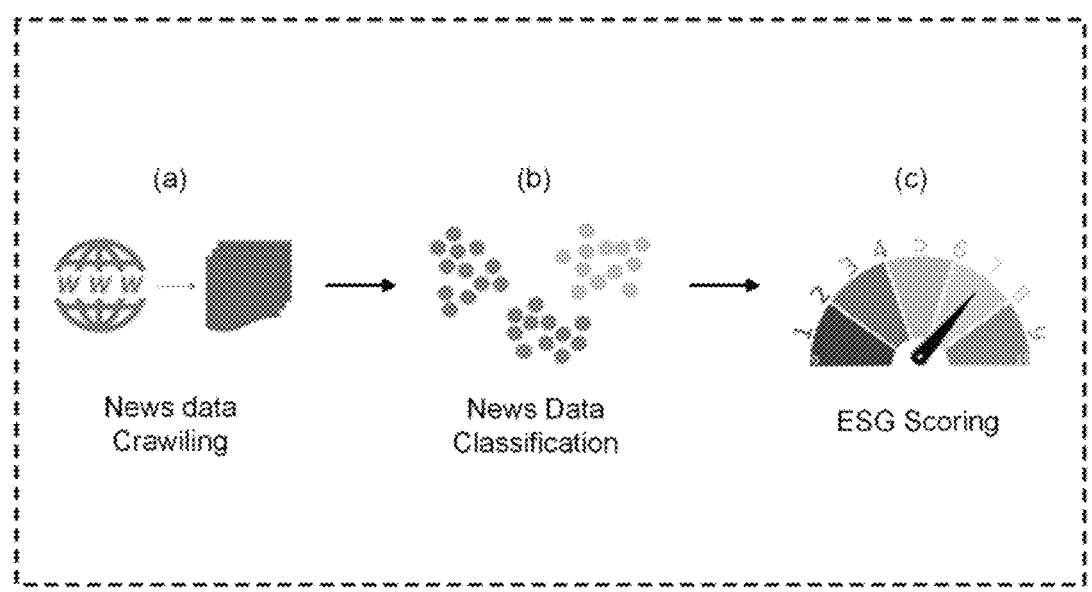
FIG. 1 is a conceptual diagram schematically illustrating a flow of performing an Environment, Social, Governance (ESG) company evaluation according to an embodiment of the present invention.

The terms used in this specification are used only for explaining specific embodiments while not limiting the present invention. The terms of a singular form may include plural forms unless referred to the contrary. The meaning of "comprises," and/or "comprising" in this specification specifies the mentioned component but does not exclude at least one another component. Like reference numerals refer to like elements throughout the specification and the term "and/or" includes any and all combinations of one or more of the associated listed items. Although "first" and "second" are used to describe various devices, components and/or sections, it is apparent that they are not limited to those terms. These terms are just used to distinguish a component from another component. Therefore, it is apparent that the first component mentioned below may be the second component within the technical spirit of the present invention.

When it is described in the entire specification that one part "includes" some elements, it means that the one part may include only those elements, or include other elements as well as those elements if there is no specific limitation. The terms "part", "module", and the like, which are described in the specification, mean a unit for processing at least one function or operation, and may be implemented in hardware or software, or in a combination of hardware and software.

FIG. 1 is a conceptual diagram schematically illustrating a flow of performing an Environment, Social, Governance (ESG) company evaluation according to an embodiment of the present invention.

The ESG company evaluation disclosed in the present invention may be automated and performed by a program implemented in the form of computer software. That is, each of the methods illustrated in FIG. 1 may be performed by performing an arithmetic process on software loaded in an ESG company evaluation device 100 that performs ESG company evaluation.

Referring to FIG. 1, the ESG company evaluation device 100 may calculate a final company evaluation result through three steps. Referring to FIG. 1(a), the ESG company evaluation device 100 may collect news articles on the Internet, which are basic data for performing company evaluation first. In collecting news articles, the ESG company evaluation device 100 determines what company the news is about, what kind of subject it is, etc. through morphological analysis and calculation of similarity between documents and performs clustering primarily to classify similar articles.

Referring to FIG. 1(b), the ESG company evaluation device 100 may perform more precise classification of news articles on the basis of the news articles collected and clustered first. In performing the news article classification operation, the ESG company evaluation device 100 first determines whether the collected news is related to the ESG, that is, at least one of environment, society, or governance, and then, determines whether the collected news is related to the environment, society, or governance and classifies them. Finally, the ESG company evaluation device 100 may perform a more detailed category classification for each news article classified into three topics of environment, society, and governance.

Referring to FIG. 1(c), the ESG company evaluation device 100 may derive the final company evaluation score based on classified news articles. In this process, the ESG company evaluation device 100 may calculate the evidence level of the main words included in the news article, and calculate the probability that the news articles belong to the environment, society, or governance in cluster units.

For convenience of explanation, the ESG company evaluation device 100 of the present invention has been illustrated and described as deriving the final ESG company evaluation score through three steps. However, it is apparent that such a step may be divided or integrated into fewer or greater numbers of steps.

Figure 2:
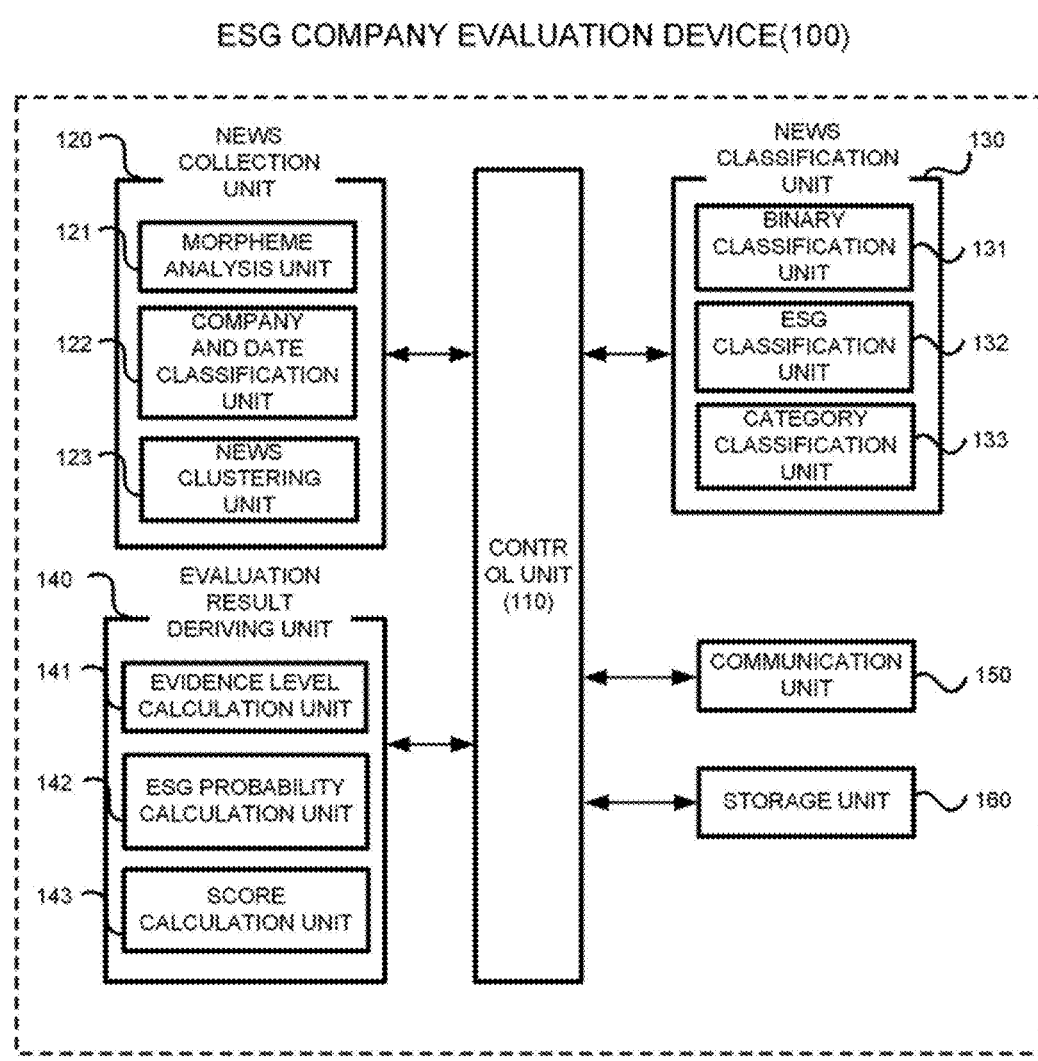
FIG. 2 is a block diagram schematically showing the configuration of an ESG company evaluation device according to an embodiment of the present invention.

FIG. 2 is a block diagram schematically showing the configuration of an ESG company evaluation device 100 according to an embodiment of the present invention.

Referring to FIG. 2, the ESG company evaluation device 100 includes a control unit 110, a news collection unit 120, a news classification unit 130, an evaluation result deriving unit 140, a communication unit 150, and a storage unit 160. In addition, the news collection unit 120 may include a morpheme analysis unit 121, a company and date classification unit 122, and a news clustering unit 123, and the news classification unit 130 may include a binary classification unit 131, an ESG classification unit 132, and a category classification unit 133, and the evaluation result deriving unit 140 may include an evidence level calculation unit 141, an ESG probability calculation unit 142, and a score calculation unit 143.

For convenience of description, entities performing respective roles in the ESG company evaluation device 100 are shown in the form of unit, but the respective portions may be subprogram modules operating in the ESG company evaluation device 100. These program modules are concepts that encompass routines, subroutines, programs, objects, components, data structures, etc., that perform each operation or execute a particular abstract data type, but are not limited thereto.

The control unit 110 according to an embodiment may perform a function of controlling a data flow between the news collection unit 120, the morpheme analysis unit 121, the company and date classification unit 122, the news clustering unit 123, the news classification unit 133, the binary classification unit 131, the ESG classification unit 132, the category classification unit 133, the evaluation result deriving unit 140, the evidence level calculation unit 141, the ESG probability calculation unit 142, the score calculation unit 143, the communication unit 150, and the storage unit 160. That is, the control unit 110 according to the present invention may control the news collection unit 120, the morpheme analysis unit 121, the company and date classification unit 122, the news clustering unit 123, the news classification unit 133, the binary classification unit 131, the ESG classification unit 132, the category classification unit 133, the evaluation result deriving unit 140, the evidence level calculation unit 141, the ESG probability calculation unit 142, the score calculation unit 143, the communication unit 150, and the storage unit 160 to perform each unique function.

The news collection unit 120 according to an embodiment may include the morpheme analysis unit 121, the company and date classification unit 122, and the news clustering unit 123 as described above. In order to perform a company evaluation, the ESG company evaluation device 100 may need to collect only news articles related to the company's environment, society or governance among the numerous news articles published on the Internet, and may not generate a false evaluation by false news or the like by obtaining news from reliable sources. The news collection unit 120 may collect news articles updated on the Internet at regular time intervals, and in collecting news articles, collect the date information of each issued news article, information on the media that issues the news, and the like together. The news collection of the news collection unit 120 may be performed through the communication unit 150 in the ESG company evaluation device 100.

The morpheme analysis unit 121 may analyze the entire text of the collected news articles in units of morpheme, which is the minimum unit of meaning. When the morpheme analysis unit 121 according to an embodiment analyzes news articles written in Korean, the device may select one of various Korean morpheme analyzers and perform analysis through it. According to an embodiment, there are various kinds of Korean morpheme analyzers such as kiwi, HAM, HLX, and Mecab, and the morpheme analysis unit 121 may perform morpheme analysis using one of them and utilize the result. According to another embodiment, in analyzing news written in languages other than Korean, the morpheme analysis unit 121 may perform morpheme analysis using a morpheme analyzer corresponding to the language.

The company and date classification unit 122 may classify the collected news articles by each company and date. The company and date classification unit 122 may determine which company the article belongs to by using a company dictionary in which company names are constructed in database form. The company and date classification unit 122 may determine which company article the particular article is for, and then check the date at which the article is published to organize the news articles by each period. According to an embodiment, the company and date classification unit 122 classifies news articles by company, and then news related to the same company may be sorted by week or by month. Such periodic classification may be used for ESG company evaluation device 100 to calculate the latest news articles in a weighted manner when performing company evaluation at a later time.

The news clustering unit 123 may configure related news covering the same issue in the collected news articles as one cluster. The news clustering unit 123 may perform a similarity calculation between news articles to check whether a plurality of news articles is related news dealing with the same issue.

According to an embodiment, the manner in which the news clustering unit 123 performs the similarity calculation between news articles may be through vectorizing each document and then calculating the cosine similarity between each vector.

The news clustering unit 123 may vectorize each news article using a Term Frequency-Inverse Document Frequency (TF-IDF). Term Frequency (TF) is a value indicating the frequency with which a specific word appears in a document. As the value is higher, the word in the document becomes more important. The frequency of occurrence of a specific word in a plurality of news articles collected may be expressed as a document frequency (DF). The inverse number of this value is Inverse Document Frequency (IDF). If a particular word frequently appears among a plurality of news articles, since the word is a cliché word and may not be a key word in a news story, it uses IDF rather than DF. TF-IDF is defined by the product of TF and IDF, and the method by which the news clustering unit 123 calculates the TF-IDF for a news article according to an embodiment of the present invention may use Equation 1.

$$w_{i,j} = tf_{i,j} \times \log\left(\frac{N}{df_i}\right) \quad \text{[Equation 1]}$$

In Equation 1, $tf_{i,j}$ represents the frequency of occurrence of the word i in the news article j, and $df_i$ represents the number of news articles containing the word i in the group of news articles.

The news clustering unit 123 may vectorize each news article based on Equation 1 and calculate the similarity between the news articles based on the vector values of the respective news articles.

$$\cos(\theta) = \frac{\sum_{i=1}^{n} A_i * B_i}{\sqrt{\sum_{i=1}^{n}(A_i)^2 * \sum_{i=1}^{n}(B_i)^2}} \quad \text{[Equation 2]}$$

According to an embodiment, the news clustering unit 123 may calculate the similarity between news articles through Equation 2. In Equation 2, A and B are respective vectors, and $A_i$ and $B_i$ denote the i-th components in A and B vectors, respectively. The cosine similarity between news articles is calculated as a number between 0 and 1. 0 means that the news articles are independent of each other, and 1 means that the news articles are completely identical to each other.

After calculating the similarity between news articles, the news clustering unit 123 may determine whether the news articles are similar based on the reference values set in advance through experiments, and may group the news articles determined to be similar into one cluster. In the following description, 'cluster' refers to a set of news articles determined as similar news by the news clustering unit 123.

The news classification unit 130 according to an embodiment may include a binary classification unit 131, an ESG classification unit 132, and a category classification unit 133 as described above. The news classification unit 130 may classify the news articles collected by the news collection unit 120 according to three criteria. The news classification unit 130 classifies the news articles primarily through the binary classification unit 131, then classifies them through the ESG classification unit 132, and finally classifies them through the category classification unit 133. In the process, news articles may be categorized by more precise criteria.

The binary classification unit 131 may determine whether each of the collected news articles is associated with ESG and classify the collected news articles in a true or false manner. That is, the binary classification unit 131 determines whether the collected news is data that may be used for ESG company evaluation, and it may be classified as TRUE if it is related to at least one of environment, society, or governance. Otherwise, it may be classified as FALSE. Therefore, the binary classification unit 131 classifies news articles that are not necessary for ESG company evaluation such as sports, entertainment, politics, arts, and the like as FALSE, the amount of news articles to be processed by the ESG company evaluation device 100 may be significantly reduced.

According to an embodiment, the ESG classification unit 132 may classify news articles classified as TRUE in the binary classification unit 131 into three issues of environment, society, or governance. Thereafter, the classified news articles may be classified into more subdivided categories by the category classification unit 133. That is, the issue of environment, society, or governance is divided into sub-categories that are more detailed, and one news article belongs to one of the sub-categories by the category classification unit 130.

According to an embodiment, the binary classification unit 131, the ESG classification unit 132, and the category classification unit 133 may perform classification of news articles using a machine learning algorithm.

When examining a method through which the binary classification unit 131, the ESG classification unit 132, and the category classification unit 133 perform classification using a machine learning algorithm, first, only nouns may be extracted from news articles through natural language analysis. According to an embodiment, the binary classification unit 131, the ESG classification unit 132, and the category classification unit 133 may use KoNLP, which is a kind of a natural language analysis package, in extracting only nouns from news articles composed in Korean. According to another embodiment, the binary classification unit 131, the ESG classification unit 132, and the category classification unit 133 may use an appropriate analysis tool for the language to extract the nouns from news articles constructed in different languages.

The binary classification unit 131, the ESG classification unit 132, and the category classification unit 133 may generate a matrix using the TF-IDF described above using Equation 1 after extracting only a noun from a news article. The matrix generated using the TF-IDF may be generated for each cluster classified by the news clustering unit 123. According to an embodiment, words (nouns) contained in each news article may be listed in the row in the generated matrix, and news articles containing the word for each word (noun) may be listed in the column.

Thereafter, the binary classification unit 131, the ESG classification unit 132, and the category classification unit 133 may perform classification corresponding to a role of each classification unit through a machine learning algorithm based on the matrix generated using the TF-IDF. According to an embodiment, the binary classification unit 131, the ESG classification unit 132, and the category classification unit 133 adopt a specific machine learning algorithm and then perform learning by receiving training data classified by the user in advance so that the classification ability may be improved. Thereafter, the test data may be inputted to the binary classification unit 131, the ESG classification unit 132, and the category classification unit 133, which perform a certain degree of learning through the training data, and each classification unit that passes the test may perform classification of news articles through the corresponding machine learning algorithm.

According to an embodiment, the binary classification unit 131, the ESG classification unit 132, and the category classification unit 133 may select and adopt at least one of machine learning algorithms such as Multinomial Bayes, Bernoulli Bayes, Stochastic Gradient Descend (SGD), Linear SVC, Perceptron, Random Forest, and the like.

The evaluation result deriving unit 140 according to an embodiment may perform ESG company evaluation based on news articles collected by the news collection unit 120 and sorted by category by the news classification unit 130. That is, the evaluation result deriving unit 140 may perform scoring on each company based on the ESG related articles and may perform the company evaluation through the score. As described above, the evaluation result deriving unit 140 may include an evidence level calculation unit 141, an ESG probability calculation unit 142, and a score calculation unit 143.

The evidence level calculation unit 141 may classify nouns extracted from news articles into a plurality of word categories. According to an embodiment, the evidence level calculation unit 141 may classify nouns as Environment Damage D_Env, Company Stakeholder S_Company, and General Damage D_gen.

FIG. 3 is a diagram for explaining a method of the evidence level calculation unit 141 to categorize nouns extracted from news articles.

Referring to FIG. 3, the evidence level calculation unit 141 may determine which item in the ESG the extracted nouns corresponds to and which element in a corresponding item it is related to, and finally perform categorization. The categorization of such nouns may be different from the categorization performed by the category classification unit 133 described above. That is, the categorization performed by the category classification unit 133 classifies each news article into sub-categories that are more detailed than the issue of environment, society, or governance, and the categorization performed by the evidence level calculation unit 141 may be a categorization of the nouns extracted from the news articles. That is, the category classification unit 133 performs categorization on each of the news articles, and the evidence level calculation unit 141 performs categorization on the nouns. Individuals belonging to a category may be different from each other in news articles and nouns.

According to an embodiment, after performing the above categorization, the evidence level calculation unit 141 may calculate how many words are included in each category item for each cluster which is a set of news articles classified by the news cluttering unit 123. As shown in FIG. 3, such words may be nouns that are extracted and completely categorized by the evidence level calculation unit 141.

The evidence level calculation unit 141 may set the priority of each category item based on the number of words included in the category item, and may normalize the number of words and calculate the evidence level of each category item based on the normalized value.

FIG. 4 is a diagram for explaining a method of the evidence level calculation unit 141 to set and normalize the priority of an item based on the number of words included in the category item, and calculate an evidence level based on normalized values.

Referring to FIG. 4, it is shown that how many words are included in each category and which words are included for each cluster. Based on the number of words included, the priority of each category may be set. In addition, the number of words included in each category is shown as a normalized value, and the evidence level is displayed based on the normalized value. The evidence level calculation unit 141 may calculate the evidence level by classifying the normalized values by intervals according to a predetermined reference value.

The ESG probability calculation unit 142 may calculate the probability on which issue of the environment, society, or governance each cluster, which is a set of similar news items, belongs to based on the category items used in the evidence level calculation unit 141.

Before calculating the probability on which issue of ESG each cluster belongs to, the ESG probability calculation unit 142 may define the category items used by the evidence level calculation unit 141 with a smaller number of sets. According to an embodiment, such sets may be classified as environment, society, governance, company risk, and other related issues.

$$EL(c) = \frac{1}{n}\sum_{i}^{n} E(C_i) \quad \text{[Equation 3]}$$

The ESG probability calculation unit 142 may calculate the evidence level for environmental, social, or governance issues for a particular cluster using Equation 3. As an example of a method of the ESG probability calculation unit 142 to calculate the evidence level for the environment, in Equation 3, $C_i$ denotes the i-th category among the categories for the environment, and n denotes the number of categories related to the environment, and $E(C_i)$ denotes the evidence level of the i-th category for the environment, which is calculated as described above in the evidence level calculation unit 141. That is, the evidence level calculated by the evidence level calculation unit 141 is an evidence level for the categories used to classify the extracted nouns, and the evidence level produced by the ESG probability calculation unit 142 is an evidence level for three types of issues of environment, society, or governance.

The ESG probability calculation unit 142 may calculate the probability on which one of three types of environment, society, or governance each cluster is related to.

$$Prob(c) = \frac{EL(c)}{\sum_k EL(c)} \quad \text{[Equation 4]}$$

The ESG probability calculation unit 142 may calculate the ESG probability of each cluster using Equation 4.

Figure 5:
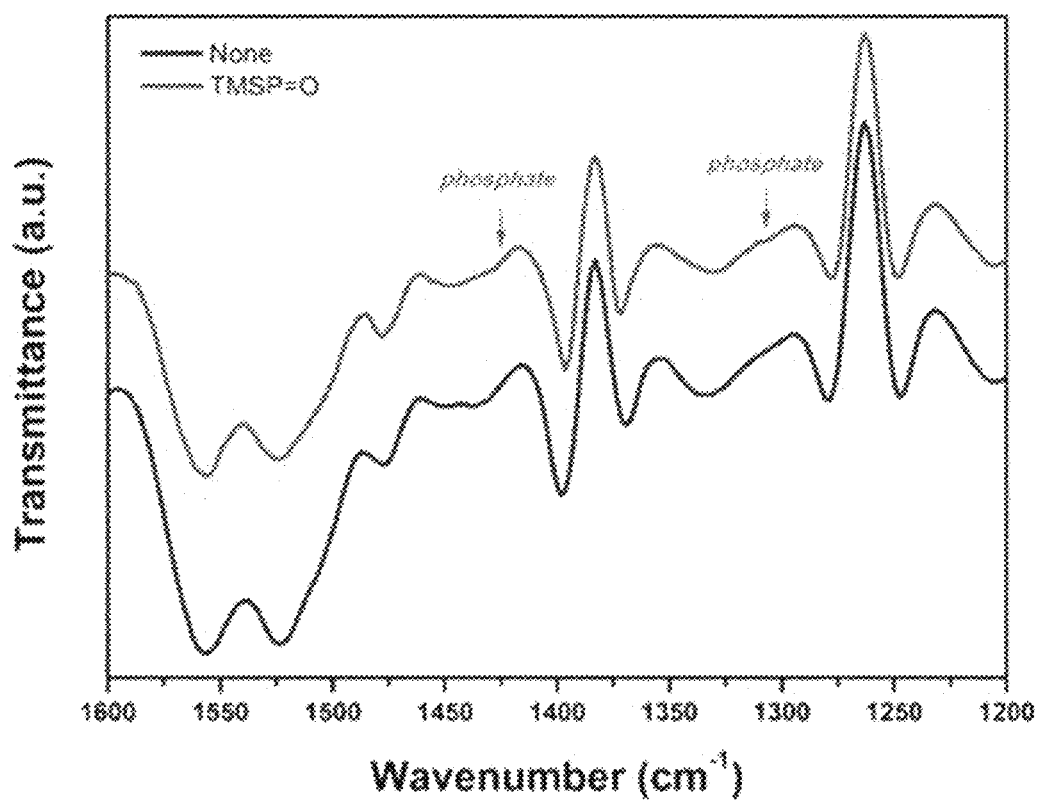
FIG. 5 is a diagram illustrating a result of the ESG probability calculation unit performing ESG probability calculation for each cluster according to an embodiment of the present invention.

FIG. 5 is a diagram illustrating a result of the ESG probability calculation unit 142 performing ESG probability calculation for each cluster according to an embodiment of the present invention.

Referring to FIG. 5, the evidence levels and ESG probabilities for three types of issues, environment, society, or governance are shown for a plurality of clusters. It may be checked that when the probabilities on which one of the environment, society, or governance issues a particular cluster is associated are all added, it becomes 1.

Before calculating the ESG company evaluation score, which is the final step of the ESG company evaluation, the score calculation unit 143 according to an embodiment may calculate ESG company evaluation scores using the auxiliary indicators calculated after calculating various auxiliary indicators. The auxiliary indicators and the ESG company evaluation score may be calculated through the calculated evidence level and the ESG probability as described above.

According to an embodiment, the various auxiliary indicators may include an ESG risk score, a company risk score, and a relevance score. It is apparent that these auxiliary indicators are not limited to the above three types but may be defined by various numbers and calculation methods.

$$\text{Consequence Score} = \max\{5, \tfrac{1}{2}(\text{ESGrisk} + \text{CompanyRisk} + \text{Relevance})\} \quad \text{[Equation 5]}$$

According to an embodiment, the score calculation unit 143 may finally calculate the ESG company evaluation score in the same manner as in Equation 5. ESGrisk, CompanyRisk, and Relevance in Equation 5 represent various auxiliary indicators. The ESGrisk may be a value obtained by calculating and summing up how many sets of news articles classified as specific clusters have risks associated with the environment, society, and company structure. The CompanyRisk may be a value related to a set relating to the company risk among the sets defined by the ESG probability calculation unit 142 and word categories classified into the corresponding set. The Relevance may be a value associated with other classified sets among the sets defined by the ESG probability calculation unit 142 and word categories classified into the corresponding set.

The communication unit 150 according to an embodiment enables communication between the ESG company evaluation device 100 and an external device. Specifically, the ESG company evaluation device 100 may communicate with the user terminal of the corresponding device, and the news collection unit 120 may collect news to be issued through the Internet connection.

The storage unit 160 according to an embodiment may store data necessary for the operation of the ESG company evaluation device 100. The storage unit 160 may store collected news articles, classification information for news articles, scoring information, and learning histories of machine learning algorithms in the form of data.

In the manner described above, the ESG company evaluation device 100 may finally derive the ESG company evaluation score for each cluster, which is a collection of similar articles.

Figure 6:
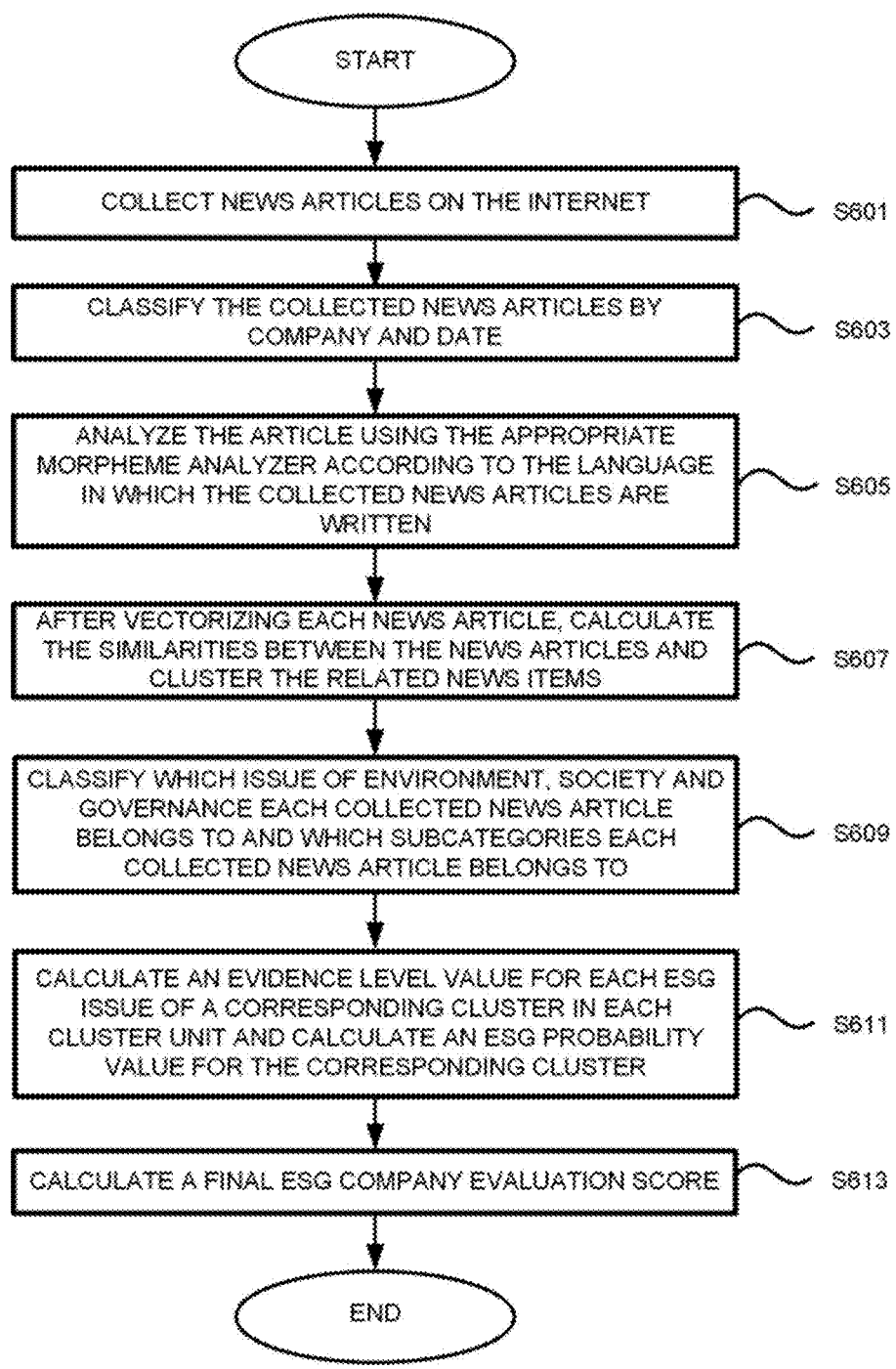
FIG. 6 is a block diagram schematically illustrating a process of deriving an ESG company evaluation score from the process of collecting news articles by the ESG company evaluation device according to an embodiment of the present invention.

FIG. 6 is a block diagram schematically illustrating a process of deriving an ESG company evaluation score from the process of collecting news articles by the ESG company evaluation device 100 according to an embodiment of the present invention.

Referring to FIG. 6, the ESG company evaluation device 100 may collect news articles, which are the basis for performing company evaluation, on the Internet at regular or irregular time intervals (S601).

Thereafter, the ESG company evaluation device 100 may classify the collected news articles by company and date (S603), and may analyze the article using the appropriate morpheme analyzer according to the language in which the collected news articles are written (S605).

After vectorizing each news article based on the news articles that are completed with morpheme analysis, the ESG company evaluation device 100 may calculate the similarities between the news articles through the similarity analysis between the vectors, and may cluster the related news items to perform clustering (S607). In this process, the ESG company evaluation device 100 may vectorize each news article using TF-IDF, and calculate the similarity between each news article through calculation of cosine similarity.

The ESG company evaluation device 100 may classify which issue of environment, society and governance each collected news article belongs to and which one of subcategories belonging to environmental, social and governance issues it belongs to (S609). In this process, the ESG company evaluation device 100 may classify whether each news article first relates to performing ESG company evaluation as TRUE or FALSE, adopt an appropriate machine learning algorithm at each classification step, and generate exercise data so that the ESG company evaluation device 100 performs learning through the corresponding algorithm. The user of the ESG company evaluation apparatus 100 may verify the ESG company evaluation device 100 that performs the learning through the machine learning algorithm and the training data, through the test data so that through this, each classification of S609 may be performed.

The ESG company evaluation device 100 may calculate an evidence level value for each ESG issue of a corresponding cluster in each cluster unit classified in S607 and calculate an ESG probability value for the corresponding cluster (S611). In this process, the ESG company evaluation device 100 classifies nouns extracted from news articles into a plurality of word categories, and classifies them into sets such as environment, society, or governance, company risk, and other related issues. Thereafter, the ESG company evaluation device 100 calculates an evidence level value for environment, society, or governance among the sets, and also calculates ESG probability values.

Finally, the ESG company evaluation device 100 may calculate a final ESG company evaluation score based on the evidence level value and the ESG probability value calculated in S611 (S613). In this process, the ESG company evaluation device 100 may utilize the ESG probability value calculated in S611 and the evidence level value of the set classified as the company risk.

When an individual or company utilizing ESG company evaluation results requires a basis for evaluation scores for a particular company, the ESG company evaluation device 100 may include a function for providing a basis for the score. In other words, when the evaluation score for a company's articles is calculated, the evaluation score may provide information that it is greatly influenced by the frequency of certain words in the articles, and may search for and provide articles including the word.

In such a way, by performing the automated company evaluation of the ESG company evaluation device 100 disclosed by the embodiments of the present invention, when similar news articles about a particular company are published on the Internet, it is possible to determine whether the news articles are about environment, society, or governance issues and how important the risk to the issue is.

Meanwhile, the ESG company evaluation device 100 according to an embodiment of the present invention may also be implemented as a computer-readable code on a computer-readable recording medium. The computer-readable recording medium is any data storage device that may store data which may thereafter be read by a computer system.

For example, the computer-readable recording medium may include a ROM, a RAM, a CD-ROM, a magnetic tape, a hard disk, a floppy disk, a removable storage device, a nonvolatile memory (e.g., flash memory), and an optical data storage device.

In addition, the computer-readable recording medium may be distributed over a networked computer system so that code readable by the processor in a distributed fashion may be stored and executed.

According to an embodiment of the present invention, the ESG company evaluation is automatically performed, thereby improving the speed at which the ESG company evaluation is derived.

According to another embodiment of the present invention, a company evaluation device in which the performance of classifying news articles by machine learning is continuously improved may be provided.

According to another embodiment of the present invention, news articles written in various kinds of languages may be analyzed and the company may be evaluated based on the analysis.

Although the exemplary embodiments of the present invention have been described, it is understood that the present invention should not be limited to these exemplary embodiments but various changes and modifications may be made by one ordinary skilled in the art within the spirit and scope of the present invention as hereinafter claimed.

What is claimed is:

1. An Environment, Social, Governance (ESG) company evaluation device for evaluating a company from the viewpoint of ESG to calculate a score, the device comprising:
   a news collection unit configured to collect a plurality of news articles on Internet and classify them by date or company, and perform clustering on news articles whose similarity is higher than a reference value through a similarity analysis between the news articles;
   a news classification unit configured to classify each of the news articles related to an issue of environment, society, or governance; and
   an evaluation result deriving unit configured to calculate an ESG risk for a corresponding cluster in cluster units and calculate an ESG company evaluation score based on the calculated value,
   wherein the evaluation result deriving unit is configured to
       perform categorization for nouns extracted from the news articles,
       perform priority setting or proof level calculation for the category items in cluster units based on a frequency of words included in each category item, and
       calculate a probability that each cluster belongs to an issue of environment, society, or governance based on a calculated evidence level value.

2. The ESG company evaluation device of claim 1, wherein the news collection unit performs morpheme analysis using a morpheme analyzer corresponding to a language in which the news articles are written, and performs vectorization on each of the news articles based on a morphological analysis result,
   wherein the similarity analysis is performed through cosine similarity analysis for each of the news articles.

3. The ESG company evaluation device of claim 2, wherein a method of the news collection unit to perform vectorization for each of the news articles through a morphological analysis result uses a Term Frequency-Inverse Document Frequency (TF-IDF) value.

4. The ESG company evaluation device of claim 1, wherein before classifying each of the news articles related to an environmental, social, or governance issue, the news classification unit first classifies in a true-false fashion whether the news articles are associated with at least one of environment, society or governance.

5. The ESG company evaluation device of claim 1, wherein after classifying each of the news articles related to an issue of environment, society, or governance, the news classification unit divides each of the issues into subdivided categories and classifies each of the news articles into the category.

6. The ESG company evaluation device of claim 1, wherein before classifying each of the news articles related to an issue of environment, society, or governance, the news classification unit adopts a specific machine learning algorithm and performs learning through practice data to improve classification ability.

7. The ESG company evaluation device of claim 6, wherein the machine learning algorithm adopted by the news classification unit is any one of Multinomial Bayes, Bernoulli Bayes, Stochastic Gradient Descend (SGD), Linear SVC, Perceptron, or Random Forest.

8. The ESG company evaluation device of claim 1, wherein in calculating the ESG company evaluation score, the evaluation result deriving unit uses the calculated evidence level value and the probability that each cluster belongs to environment, society, or governance.

9. A method of an Environment, Social, Governance (ESG) company evaluation device to evaluate a company from the viewpoint of ESG and calculate a score, the method comprising:
collecting a plurality of news articles on Internet and classify them by date or company, and performing clustering on news articles whose similarity is higher than a reference value through a similarity analysis between the news articles;
classifying each of the news articles related to an issue of environment, society, or governance; and
calculating an ESG risk for a corresponding cluster in cluster units and calculating an ESG company evaluation score based on the calculated value,
wherein the step of calculating the ESG risk further comprises:
performing categorization for nouns extracted from the news articles;
performing priority setting or proof level calculation for the category items in cluster units based on a frequency of words included in each category item; and
calculating a probability that each cluster belongs to an issue of environment, society, or governance based on a calculated evidence level value.

* * * * *